United States Patent

Lengick

[15] 3,692,865

[45] Sept. 19, 1972

[54] ROOM TEMPERATURE CURABLE ORGANOPOLYSILOXANES AND PROCESS FOR PREPARING SAME

[72] Inventor: Guenther Fritz Lengick, 16 Maumee Court, Adrian, Mich. 49221

[22] Filed: Dec. 30, 1970

[21] Appl. No.: 103,008

[52] U.S. Cl............260/827, 117/123 D, 117/135.1, 117/138.8 UA, 117/148, 260/18 S, 260/37 SB, 260/46.5 E, 260/46.5 G
[51] Int. Cl. .............................................C08g 47/10
[58] Field of Search ...260/827, 46.5 G, 46.5 E, 18 SI

[56] References Cited

UNITED STATES PATENTS 3,555,109  1/1971  Getson ......................260/825
3,560,244  2/1971  Neuroth ......................117/71
3,580,971  5/1971  Getson ......................260/825

*Primary Examiner*—Donald E. Czaja
*Assistant Examiner*—M. I. Marquis
*Attorney*—Marion D. Ford, Lloyd L. Mahone and Robert C. Sullivan

[57] ABSTRACT

The invention relates to siloxane cross-linking agents and to curable one-component modified organopolysiloxanes obtained from the reaction of the siloxane cross-linking agents and a hydroxyl-terminated modified organopolysiloxane to form a composition which is curable by ambient moisture.

6 Claims, No Drawings

ROOM TEMPERATURE CURABLE ORGANOPOLYSILOXANES AND PROCESS FOR PREPARING SAME

This invention relates to curable one-component organopolysiloxanes, particularly organopolysiloxanes which are activated in the presence of moisture and more particularly to room-temperature curable organopolysiloxanes which are obtained from the reaction of siloxane cross-linking agents and hydroxyl-terminated modified organopolysiloxanes.

Heretofore, it was known that certain fluid organopolysiloxanes, when exposed to atmospheric moisture at room temperature, are converted to an elastomeric state. The desirability of a room-temperature curable system is well known; however, the conventional room-temperature curable system involves two or more stable components which, when mixed together, rapidly cure to a solid workable state. In other words, the end-user was provided with a two-package system in which one component was added just prior to use. Although the two-package system is adequate in a number of applications, there are other applications where the two-package system is undesirable because of the lack of skilled workmen or because of equipment which is inadequate to carry out the necessary mixing operation. Consequently, there was a definite need in the industry for a one-package, room-temperature curable system which was provided by the introduction of linear polysiloxanes containing two or more acyloxy-functional radicals. While these single component room-temperature curable compositions have met with commercial success, it has been extremely difficult to adapt them to some circumstances where extended working times are desirable or necessary. Also, some of the single component room-temperature curable compositions cure rapidly on the surface exposed to moisture while the interior remains in an uncured state for a long period of time. In addition, in some commercial applications it is desirable to provide an organopolysiloxane elastomer in a single package which is resistant to compression, has greater solvent resistance, improved cross-linking and improved hardness. Heretofore, none of the organopolysiloxane compositions commercially available provided all of these desirable properties.

It is therefore an object of this invention to provide organopolysiloxane compositions which are curable at room temperature. Another object of this invention is to provide compositions which vary in working time without reducing the cross-linking ability of the polymers employed. Still another object of this invention is to provide modified organopolysiloxane compositions which will cure in deep sections free of voids. Still another object of this invention is to provide curable modified organopolysiloxane compositions having improved physical properties. A further object of this invention is to provide novel cross-linking agents which will react with hydroxyl-terminated modified organopolysiloxane compositions to form elastomeric materials. A still further object of this invention is to provide curable, modified organopolysiloxane compositions which may be dispensed as a single package.

The foregoing objects, and others which will become apparent from the following description, are accomplished in accordance with this invention, generally speaking, by providing curable compositions comprising modified organopolysiloxanes of the general formula:

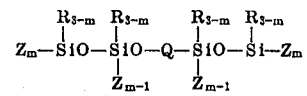

wherein the R($s$), which may be the same or different, represent monovalent hydrocarbon radicals, halogenated monovalent hydrocarbon radicals or cyanoalkyl radicals; Q represents a silicone radical of the formula:

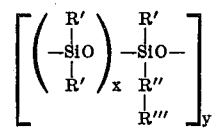

wherein the R'($s$) which may be the same or different represent monovalent hydrocarbon radicals, halogenated monovalent hydrocarbon radicals or cyanoalkyl radicals; R'' is a divalent hydrocarbon radical; R''' is a polymeric organic radical constituted of recurring units derived from monomers containing olefinic unsaturation and is linked to R'' by a carbon-to-carbon linkage, said monomers being selected from the class consisting of straight chain olefins, whether or not attached to an aromatic nucleus, halogenated olefins, again whether or not attached to an aromatic nucleus, unsaturated acids, esters of organic acids in which either the esterifying group or the derivative acid is unsaturated, unsaturated amides, and unsaturated nitriles; Z is a radical hydrolyzable by ambient moisture; $m$ is a number greater than 1; $x$ is a number from 0 to 20,000 and y is a number from 1 to 500.

The organopolysiloxanes of this invention may be prepared by reacting organodisiloxanes of the formula:

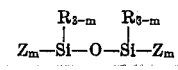

with an organopolysiloxane of the formula:

wherein R, Q, Z, and m are the same as those represented above.

The organic radicals represented by R and R' above are selected from the class consisting of alkyl radicals having from one to 18 carbon atoms such as methyl, propyl, butyl, hexyl, octyl, decyl, dodecyl, tetradecyl, octadecyl; aryl radicals such as phenyl, diphenyl, naththyl and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluorophenyl and the like; alkenyl radicals such as vinyl, allyl and the like. The group represented by R'' is a divalent radical having from one to eight carbon atoms, such as, methylene, ethylene, trimethylene, tetramethylene, hexamethylene and octamethylene; R''' is a polymer or copolymer linked to a silicon atom of the organopolysiloxane through the divalent hydrocarbon radical R" above. Z represents groups which are hydrolyzable by ambient moisture such as:

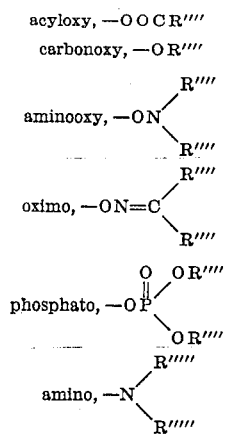

Radicals represented by R'''' which may be the same or different are monovalent hydrocarbon radicals and halogenated monovalent hydrocarbon radicals, and R''''' may be the same as R'''' or hydrogen. Examples of suitable hydrolyzable groups are monoacyl radicals of carboxylic acids having from one to 18 carbon atoms such as formoxy, acetoxy, propionyloxy, valeryloxy, caproyloxy, myristoyloxy and stearoyloxyradicals; carbonoxy groups having from one to 10 carbon atoms such as methoxy, ethoxy, butoxy, heptoxy, octoxy, decoxy, phenoxy and the like; aminooxy radicals such as dimethylaminooxy, diethylaminooxy, dipropylaminooxy, dibutylaminooxy, dioctylaminooxy, diphenylaminooxy, ethylemthylaminooxy, methylphenylaminooxy and the like. Suitable oximo radicals are acetophenoximo, acetoximo, benzophenoximo, 2-butanoximo, diisopropylketoximo, chlorocyclohexanoximo, alpha-bromoacetophenoximo and the like. Examples of suitable phosphato groups are dimethylphosphato, diethylphosphato, dipropylphosphato, dibutylphosphato, dihexylphosphato, dioctylphosphato, didodecylphosphato, dioctadecylphosphato, methylethylphosphato, ethylpropylphosphato, methylhexylphosphato, butylhexylphosphato, methyldodecylphosphato, methyloctadecylphosphato, ethyltetradecylphosphato, diphenylphosphato, methylphenylphosphato, butylphenylphosphato and the like. Amino radicals having up to 10 carbon atoms which may be employed in this invention are N,N-dimethylamino, N,N-diethylamino, N,N-dibutylamino, N,N-dihexylamino, N-methyl, N-ethylamino, N-methylamino, N-ethylamino, N-hexylamino, N-phenylamino and the like.

Generally, when organosilanes having two or more hydrolyzable groups are pyrolyzed or hydrolyzed at elevated temperatures, the disiloxanes as well as mixtures and higher homologs of these disiloxanes are formed. These disiloxane cross-linking agents may also be prepared by reacting an organohalosilane with a compound having any of the above described hydrolyzable groups to form corresponding compounds having groups which are hydrolyzable at ambient moisture. In other words, disiloxanes containing hydrolyzable groups may be obtained from the reaction of organohalosilanes and organic compounds containing the appropriate functional groups at a temperature of from about room temperature to about 150°C., preferably from about 40° to 120°C. in the presence of a solvent which is inert to the reactants and the reaction product. Suitable solvents include aliphatic hydrocarbons such as pentane, hexane, heptane, octane; aromatic hydrocarbons such as benzene, toluene, xylene, naphthalene; as well as halogenated solvents such as methylene chloride, fluorobenzene and the like. Other solvents which may be used are organic ethers such as petroleum ether, diethyl ether, dibutyl ether and hydroxyl-free fluid siloxanes.

Where it is desirable to prepare disiloxanes having phosphato functional groups, the halogen containing silanes may be reacted with phosphoric acid or an alkali metal salt or an alkaline earth metal salt of said acid in the presence of one of the inert organic solvents described heretofore.

The conventional linear organopolysiloxanes described heretofore, may be prepared from difunctional organosilanes of the formula:

$$(R')_2SiX_2$$

wherein the R'(s), which may be the same or different, represent halogenated or unhalogenated aliphatic, alicyclic or aromatic hydrocarbon radicals, such as, methyl, ethyl, vinyl, allyl, cyclohexyl, cyclohexenyl, and phenyl and X represents hydrolyzable atoms or groups, such as, halogen atoms or alkoxy groups.

The organopolysiloxanes may be homopolymers as well as copolymers, that is, compounds derived from two or more different diorganosilanes and even the organic radicals linked to any particular silicon atom may be different organic radicals. Especially useful are the dimethylsiloxanes, methylphenylsiloxanes and the methylvinylsiloxanes.

Generally, the modified organopolysiloxanes consist of an organosilicone polymer having attached thereto at least one or more side chains or branches consisting of a carbon chain polymer. These modified organopolysiloxanes may be prepared by abstracting hydrogen from the organosilicone polymer by free-radical initiators to form an active site for grafting organic polymers thereto. By grafting, we mean to include compositions in which some of the organic polymer is connected to the silicone polymer as well as where the organic polymer is retained within the lattice structures of the organosilicone polymer. Any organopolysiloxane may be used providing it has active sites or is capable of producing active sites under the proper conditions. Thus, the silicone polymer should be one which is capable of producing a substantial and a recognizable number of free radicals, and it should be substantially free of any tendency to undergo any further polymerization under the conditions employed. Where hydrogen is abstracted in the presence of a free radical, it is preferred that the organopolysiloxane have lower alkyl radicals attached to the silicon atoms, since these are more amenable to hydrogen abstraction than other radicals.

Examples of suitable organopolysiloxane polymers and copolymers which may be used in the formation of grafted polymers are hydroxyl-terminated siloxane fluids (OH-Fluids) having methyl, phenyl, methylphenyl or methyl vinyl groups and copolymers of dimethylsiloxane and phenylmethyl or diphenyl siloxane units.

Any polymerizable organic monomer having ethylenic unsaturation may be grafted to the organopolysiloxane polymer. Examples of suitable monomers are low molecular weight straight-chained hydrocarbons and such as ethylene, propylene, butylene; vinyl halides such as vinyl fluoride and vinyl chloride; vinyl esters of organic acids such as vinyl acetate, vinyl silicone, styrene, ring-substituted styrenes and other vinyl aromatics such as vinyl pryidine and vinyl naththalene; acrylic acid and derivatives of acrylic acid including salts, esters, amides and acrylonitrile; N-vinyl pyrrolidone and N-vinyl caprolactam and vinyl silicon compounds such as vinyltriethoxysilane.

Disubstituted ethylenes of the type $CH_2=CX_2$ may be used including vinylidene fluoride vinylidene chloride, vinylidene cyanide, methacrylic acid and compounds derived therefrom such as salts, esters and amides as well as methacrolein, methacrylonitrile and the like.

Examples of disubstituted ethylenes of the type $CHX=CHX$ such as vinylidene carbonate and various monomers which polymerize best in the presence of other monomers, e.g. maleic anhydride, esters of maleic and fumaric acids, stilbene, indene and coumarone may be used in the formation of these modified polymers.

As before emphasized, the monomers may be used singly or in combinations of two or three or even more. Properties of the graft product, of course, depend upon the nature and identity of the monomeric material as well as on the amounts used relative to the organopolysiloxanes.

The grafting operation is most expeditiously effected by using a free radical initiator, normally organic peroxides, although other free radical initiators such as azo compounds in which both the N atoms of the azo linkage are attached to a tertiary-carbon atom; the remaining valences of the tertiary-carbon atom being satisfied by nitrile, carboxy, cycloalkylene or alkyl radicals, preferably having from one to 18 carbon atoms. In addition to the above mentioned initiators, ionized radiation may also be used to bring about the formation of free radicals.

The amount of free radical initiator used is not critical. Thus, any amount capable of producing a perceptible degree of grafting is suitable. Generally, as low as 0.05 percent of the more active peroxide initiators based on the weight of the monomer is adequate in most cases. However, where it is desirable to increase the reaction rate, then as much as 3 percent or even more of the initiator may be used.

The grafting step may be carried out at temperatures between about 25° and 150°C., preferably between about 60° and 130°C. in the presence of these free radical initiators. While the reaction may be carried out in the absence of these initiators, a substantially higher temperature, often up to as high as 200°C. may be advantageously used. Although the grafting step may be conducted in the presence of an inert solvent, that is, a solvent which is unreactive to the monomer or the organopolysiloxane in the presence of a free radical initiator, it is preferred that the grafting step be conducted in the absence of the solvent. Examples of solvents which may be employed, where desired, are hexane, heptane, benzene, toluene, xylene, naphthalene and the like.

Although it is not essential, it is preferred that the organopolysiloxanes used in the grafting operation contain terminal-hydroxyl groups. The grafted polymer may then be appropriately treated to substitute groups which are hydrolyzable by ambient moisture for the hydroxyl groups.

The grafted polymer may be separated from unreacted monomers by any conventional technique known in the art, such as, by distillation, solvent extraction or selective solvent fractionation.

The curable compositions of this invention may be prepared by reacting the disiloxanes described heretofore with the modified organopolysiloxanes of any convenient temperature. Generally, temperatures ranging from about 30° to 50°C. are sufficient; however, it should be understood, that higher or lower temperatures may be employed if desired. The reaction may be carried out in the presence of an inert solvent, that is, a solvent which is unreactive with both the terminal hydroxyl groups on the modified organopolysiloxane or the functional groups on the disiloxanes. The presence of a solvent may be particularly desirable where the hydroxyl-terminated modified organopolysiloxane has a high viscosity or in cases where a solvent is necessary to reduce the overall viscosity of the mixture.

The ratio of cross-linking agent to modified organopolysiloxane is not critical, however, it is preferred that at least one mole of the cross-linking agent be present for each mole of silicon-bonded hydroxyl group and more preferably from about 2 to 5 moles of the cross-linking agent be used per mole of the silicon-bonded hydroxyl group on the modified organopolysiloxane. It is possible, to use up to about 12 moles of cross-linking agent per mole of silicon-bonded hydroxyl group since a large excess of the disiloxane insures complete reaction with all of the silicon-bonded hydroxyl groups. It is preferred that the reaction be carried out in the absence of moisture, since the latter may interfere with the reaction. However, traces of moisture are not especially harmful if an excess of the cross-linking agent is used.

The composition of this invention may consist solely of the reaction product of a modified organopolysiloxane and a disiloxane cross-linking agent containing hydrolyzable groups. However, mineral fillers in the form of fine powders may be added to modify the consistency of the uncured composition or to reinforce the cured product.

Examples of mineral fillers which may be used are various kinds of silicas, oxides of iron, zinc, cadmium, aluminum and carbonates. The proportion and type of filler employed will depend to a certain extent on the particular use to which the composition is to be applied. Silicas obtained by precipitation, for example, those sold under the trade names SANTOCEL and HI-SIL and silicas obtained from combustion such as those sold under the trade name AEROSIL are particularly suitable for production of reinforced elastomeric products. These micro-fine silicas have a large absorptive surface and are effective even in small quantities. Fillers such as milled natural silicas and calcium carbonate can, on the other hand, be employed in large proportions, for example, 100 percent based on the weight of the modified organopolysiloxane.

In addition to the fillers mentioned heretofore, compositions conforming to the invention may contain coloring agents, thixotropic agents, agents capable of preventing the passage of ultraviolet light, desiccants and antioxidants.

In addition to the constituents mentioned above, the composition may contain, for the purpose of accelerating the curing rate, certain compounds which have a catalytic effect on the condensation reactions. Although several compounds are known which accelerate the curing rate, organotin compounds were found to be desirable. Examples of suitable tin salts are tin naphthenate, tin-2-ethylhexanoate, tin benzoate, dibutyltin dilaurate, dibutyltin diacetate, bis(dibutyltin oleate)oxide, bis(dibutyltin stearate)oxide, dibutyltin oleate hydroxide, dibutyltin butoxychloride, and the like. The catalyst may be used in an amount of from about 0.001 to about 2 percent, preferably from about 0.2 to about 0.5 percent based on the weight of the modified organopolysiloxanes.

The curable composition may be prepared by mixing the hydroxyl-terminated modified organopolysiloxanes and a filler in any conventional mixing apparatus, such as, a Sigma Blade Mixer, roller mill, Banbury Mixer and the like, and thereafter heating the mixture for a sufficient time to eliminate all traces of moisture. The reaction mass is cooled and the disiloxane cross-linking agent containing hydrolyzable groups is added. If desired, a catalyst and an anhydrous inert organic diluent may also be incorporated in the composition. If the composition is not used immediately, it should be stored under anhydrous conditions. These compositions may be kept several months and even years in hermetically sealed containers.

The compositions of this invention may be cured by merely exposing them to atmospheric moisture without any additional water vapor. The cure time may vary from a few minutes up to several hours or days depending upon the type of groups present on the cross-linking agent. In general, an increase in molecular weight of any of the groups will increase the cure time.

The products of this invention adhere to a variety of materials such as, for example, wood, metal, glass, ceramics, plastics and the like. In the case of substrates having poor adhesion properties, it may be desirable to apply an appropriate pre-treatment to the surface before applying the compositions of this invention. These self-curing compositions may also serve as caulking compounds, coatings for various articles such as electrical equipment, glass, metals, fabrics, protecting various supports and producing films of molded articles. They may be applied by any of the usual techniques such as by dipping, doctoring or spraying.

Various aspects of the invention are further illustrated by the following examples which are not to be taken as in any way limiting the scope thereof. In the examples, all parts are by weight unless otherwise specified.

EXAMPLE 1

To a reactor equipped with a reflux condenser, addition funnel and agitator are added about 44 parts of methyltriacetoxysilane in about 150 parts of dioxane. About 1.8 parts of water in about 60 parts of dioxane are added dropwise to the reactor. The reactants are heated and refluxed for about 1 hour. The volatile materials and solvent are removed in vacuo (1 mm. Hg). A residual product is recovered which by infrared analysis has an Si—O—Si bond and is identified as 1,3-dimethyl-1,1,3,3-tetraacetoxy-1,3-disiloxane.

EXAMPLE 2

In accordance with the procedure described in Example 1, about 1.8 parts of water in about 50 parts of dioxane are added dropwise to about 50 parts of propyltriacetoxysilane in about 150 parts of dioxane. A residual product is recovered which contains Si—O—Si bonds and is identified as 1,3-dipropyl-1,1,3,3-tetraacetoxy-1,3-disiloxane.

EXAMPLE 3

In accordance with the procedure described in Example 1, about 1.8 parts of water in about 30 parts of dioxane are added dropwise to about 77.7 parts of methyltricaproyloxysilane in about 200 parts of dioxane. A residual product is recovered which contains Si—O—Si bonds and is identified as 1,3-dimethyl-1,1,3,3-tetracaproyloxy-1,3-disiloxane.

EXAMPLE 4

To a reactor fitted with a mechanical agitator, reflux condenser, nitrogen inlet and addition funnel are added about 30 parts of methyltrichlorosilane in about 100 parts of dioxane. To this mixture are added dropwise 1.8 parts of water in about 10 parts of dioxane. The reactants are heated and refluxed for about 1 hour. To the residual product are added with agitation over a 30 minute period about 82 parts of acetic anhydride in about 150 parts of dioxane. The reaction mass is refluxed for about 45 minutes and the volatile materials removed in vacuo (1 mm. Hg). The residual product is recovered which by infrared analysis has Si—O—Si bonds and contains 1,3-dimethyl-1,1,3,3-tetraacetoxy-1,3-disiloxane.

EXAMPLE 5

To a reactor equipped with a reflux condenser and agitator are added about 44 parts of methyltriacetoxysilane and heated to a temperature of about 150°C. After about 1 hour at this temperature, the volatile products are removed in vacuo (1 mm. Hg). A residual product is recovered which by infrared analysis shows the presence of Si—O—Si bonds and contains 1,3-dimethyl-1,1,3,3-tetraacetoxy-1,3-disiloxane.

EXAMPLE 6

To a reactor equipped with a reflux condenser, addition funnel and agitator are added about 223 parts of propyl tris(N,N-diethylaminooxy)silane in about 200 parts of dioxane. About 6 parts of water in about 20 parts of dioxane are added dropwise to the reactor. The reactants are heated and refluxed for about 1 hour and the volatile materials and solvent are removed in vacuo (1 mm. Hg). A residual product is recovered which by infrared analysis shows the presence of Si—O—Si bonds and contains 1,3-dipropyl-1,1,3,3-tetrakis-(N,N-diethylaminooxy)-1,3-disiloxane.

EXAMPLE 7

In accordance with the procedure described in Example 6, about 6 parts of water in about 20 parts of dioxane is added dropwise to about 205 parts of methyl tris(N,N-diethylaminooxy)silane. A residual product is recovered which contains Si—O—Si linkages and is identified as 1,3-dimethyl-1,1,3,3-tetrakis(N,N-diethylaminooxy)-1,3-disiloxane.

EXAMPLE 8

In accordance with the procedure described in Example 6, about 541 parts of methyl tris(N,N-dioctylaminooxy)silane in about 300 parts of dioxane are reacted with about 6 parts of water in about 20 parts of dioxane. A residual product is recovered which shows the presence of Si—O—Si bonds and contains 1,3-dimethyl-1,1,3,3-tetrakis(N,N-dioctylaminooxy)-1,3-disiloxane.

EXAMPLE 9

In accordance with the procedure described in Example 6, about 6 parts of water in about 20 parts of dioxane is added dropwise to about 261 parts of methyl tris(N-butyl-N-ethylaminooxy)silane. A residual product is recovered which by infrared analysis shows the presence of Si—O—Si bonds and contains 1,3-dimethyl-1,1,3,3-tetrakis(N-butyl-N-ethyl aminooxy)-1,3-disiloxane.

EXAMPLE 10

About 6 parts of water is about 20 parts of dioxane are added dropwise to about 163 parts of tetrakis(N,N-dimethylaminooxy)silane in about 200 parts of dioxane in accordance with the procedure described in Example 6. A residual product is recovered which by infrared analysis shows the presence of Si—O—Si bonds and contains 1,1,1,3,3,3-hexakis(N,N-dimethylaminooxy)disiloxane.

EXAMPLE 11

About 6 parts of water in about 20 parts of dioxane are added to about 214 parts of butyl tris(N,N-diethylaminooxy)silane in about 200 parts of dioxane in accordance with the procedure described in Example 6. A residual product is recovered which by infrared analysis shows the presence of Si—O—Si bonds and is identified as 1,3-dibutyl-1,1,3,3-tetrakis(N,N-diethylaminooxy)-1,3-disiloxane.

EXAMPLE 12

About 6 parts of water in about 20 parts of dioxane are added to about 173 parts of methyl triacetoximosilane in about 200 parts of dioxane in accordance with the procedure described in Example 6. A residual product is recovered which by infrared analysis shows the presence of Si—O—Si bonds and contains 1,3-dimethyl-1,1,3,3tetracetoximo-1,3-disiloxane.

EXAMPLE 13

About 6 parts of water in about 20 parts of dioxane are added dropwise to about 201 parts of butyl triacetoximosilane in about 150 parts of dioxane in accordance with the procedure described in Example 6. A residual product is recovered which by infrared analysis shows the presence of Si—O—Si bonds and contains 1,3-dibutyl-1,1,3,3-tetraacetoximo-1,3-disiloxane.

EXAMPLE 14

About 6 parts of water in about 20 parts of dioxane are added to about 297 parts of methyl triacetophenoximosilane in about 250 parts of dioxane in accordance with the procedure described in Example 6. A residual product is recovered which by infrared analysis shows the presence of Si—O—Si bonds and contains 1,3-dimethyl-1,1,3,3-tetraacetophenoximo-1,3-disiloxane.

EXAMPLE 15

About 6 parts of water in about 20 parts of dioxane are added dropwise to about 421 parts of methyl tribenzophenoximosilane in accordance with the procedure described in Example 6. A residual product is recovered which by infrared analysis shows the presence of Si—O—Si bonds and contains 1,3-dimethyl-1,1,3,3-tetrabenzophenoximo-1,3-disiloxane.

EXAMPLE 16

About 6 parts of water in about 20 parts of dioxane are added to about 201 parts of methyl tributyraldoximosilane in about 260 parts of dioxane in accordance with the procedure described in Example 6. A residual product is recovered which by infrared analysis shows the presence of Si—O—Si bonds and contains 1,3-dimethyl-1,1,3,3-tetrabutyraldoximo-1,3-disiloxane.

EXAMPLE 17

About 6 parts of water in about 20 parts of dioxane are added to about 257 parts of methyl trihexanoximosilane in about 240 parts of dioxane in accordance with the procedure described in Example 6. A residual product is recovered which by infrared analysis shows the presence of Si—O—Si bonds and contains 1,3-dimethyl-1,1,3,3-tetrahexanoximo-1,3-disiloxane.

EXAMPLE 18

About 6 parts of water in about 20 parts of dioxane are added dropwise to about 201 parts of methyl tris(methylethylketoximo)silane in about 250 parts of dioxane in accordance with the procedure described in Example 6. A residual product is recovered which by infrared analysis shows the presence of Si—O—Si bonds and contains 1,3-dimethyl-1,1,3,3-tetrakis(methylethylketoximo)-1,3-disiloxane.

EXAMPLE 19

To a reactor are added about 250 parts of propyl triacetoximosilane in the presence of a nitrogen atmosphere. The reactor is evacuated and the reaction mass heated to about 125°C. for about 4 hours and then cooled to room temperature. The volatile materials are removed under vacuum and the residual product is purified by dissolution in dioxane and filtered under nitrogen. The dioxane is removed in vacuo (1 mm. Hg) and the residual product is analyzed. Infrared analysis shows the presence of Si—O—Si bonds and the product contains 1,3-dipropyl-1,1,3,3-tetraacetoximo-1,3-disiloxane.

EXAMPLE 20

In accordance with the procedure described in Example 19, 200 parts of methyltriacetoximosilane are heated in a reactor for about 5 hours at a temperature of about 125°C. A residual product is recovered which by infrared analysis shows the presence of Si—O—Si bonds and contains 1,3-dimethyl-1,1,3,3-tetraacetoximo-1,3-disiloxane.

EXAMPLE 21

To a reactor equipped with a reflux condenser, agitator and dropping funnel are added about 335 parts of methyl tris(diethylphosphato)silane in about 250 parts of dioxane. About 6 parts of water in about 20 parts of dioxane are added dropwise to the reactor. The reactants are heated at reflux for about 1 hour after which time the volatile materials and solvent are removed in vacuo (1 mm. Hg). A residual product is recovered which by infrared analysis shows the presence of Si—O—Si bonds and contains 1,3-dimethyl-1,1,3,3-tetrakis-(diethylphosphato)-1,3-disiloxane.

EXAMPLE 22

About 6 parts of water in about 20 parts of dioxane are added to a reactor containing about 363 parts of butyl tris(diethylphosphato)silane in about 600 parts of dioxane in accordance with the procedure described in Example 21. The volatile materials and solvent are removed in vacuo (1 mm. or less Hg). The residual product shows the presence of Si—O—Si bonds by infrared analysis and contains 1,3-dibutyl-1,1,3,3-tetrakis(diethylphosphato)-1,3-disiloxane.

EXAMPLE 23

About 6 parts of water in about 20 parts of dioxane are added dropwise to about 279 parts of methyl tris(dimethylphosphato)silane in about 280 parts of dioxane in accordance with the procedure described in Example 21. A residual product is recovered which by infrared analysis shows the presence of Si—O—Si bonds and is identified as 1,3-dimethyl-1,1,3,3-tetrakis(dimethylphosphato)-1,3-disiloxane.

EXAMPLE 24

About 6 parts of water in about 20 parts of dioxane are added dropwise to a reactor containing about 527 parts of methyl tris(diphenylphosphato)silane in about 450 parts of dioxane in accordance with the procedure described in Example 21. After refluxing the reactants for a period of 1.8 hours, the volatile materials and solvent are removed in vacuo (1 mm. Hg). Infrared analysis of the residual product shows the presence of Si—O—Si bonds. The product contains 1,3-dimethyl-1,1,3,3-tetrakis(diphenylphosphato)-1,3-disiloxane.

EXAMPLE 25

To a reactor containing approximately 99 parts of methyltrichlorosilane in 200 parts of dry heptane are added about 6 parts of water dispersed in about 5 parts of heptane and reacted at −10°C. under an atmosphere of nitrogen. The resulting hydrolysis product is identified as 1,3-dimethyl-1,1,3,3-tetrachloro-1,3-disiloxane.

To about 24 parts of the siloxane prepared above in about 100 parts of dry heptane are added about 71 parts of N,N-diethylhydroxylamine in about 150 parts of dry heptane and heated to reflux temperature for about 1 hour. A precipitate is formed which is removed by filtration and identified as N,N-diethylhydroxylamine hydrochloride. The heptane solvent and excess N,N-diethylhydroxylamine are removed in vacuo yielding a residual product containing 1,3-dimethyl-1,1,3,3-tetrakis(N,N-diethylaminooxy)-1,3-disiloxane.

EXAMPLE 26

To a solution containing about 24 parts of 1,3-dimethyl-1,1,3,3-tetrachloro-1,3-disiloxane prepared in Example 25, about 150 parts of toluene and 32 parts of pyridine are added dropwise with agitation about 29 parts of acetoxime dissolved in about 150 parts of ethyl ether. As the exothermic reaction progresses small increments of toluene are added to disperse the large volume of pyridine hydrochloride formed. After the reaction is complete, the reaction mass is cooled to room temperature and the product mixture is filtered and stripped of toluene and excess pyridine. A residual product is recovered which contains 1,3-dimethyl-1,1,3,3-tetraacetoximo-1,3-disiloxane.

EXAMPLE 27

To a solution containing about 24 parts of 1,3-dimethyl-1,1,3,3-tetrachloro-1,3-disiloxane prepared in Example 25, and about 500 parts of benzene are added about 62 parts of diethylhydrogenphosphate in about 100 parts of benzene and refluxed for about 1 hour with agitation. Nitrogen is swept through the solution for approximately 4 hours and then the solvent and volatile materials are removed under vacuum distillation. A residual product is obtained which contains 1,3-dimethyl-1,1,3,3-tetrakis(diethylphosphato)-1,3-disiloxane.

EXAMPLE 28

To about 24.4 parts of 1,3-dimethyl-1,1,3,31tetrachloro-1,3-disiloxane in about 100 parts of toluene are added about 18.5 parts of ethanol and heated to reflux temperature for about 1 hour. The toluene solvent, HCl and ethanol are removed in vacuo yielding a residual product containing 1,3-dimethyl-1,1,-3,3-tetraethoxy-1,3-disiloxane.

EXAMPLE 29

The procedure described in Example 38 is repeated except that 30 parts of n-butanol are substituted for the ethanol. The resulting product contains 1,3-dimethyl-1,1,3,3-tetrabutoxy-1,3-disiloxane.

EXAMPLE 30

The procedure described in Example 28 is repeated except -tetrachloro-32.8 parts of 1,3-dibutyl-1,1,3,3-tetrachloro-1,3-disiloxane are substituted for 1,3-dimethyl-1,1,3,3-tetrachloro-1,3-disiloxane. The resulting product contains 1,3-dibutyl-1,1,3,3-tetraethoxy-1,3-disiloxane.

EXAMPLE 31

The procedure described in Example 28 is repeated except that 38 parts of phenol are substituted for the ethanol. The resulting product contains 1,3-dimethyl-1,1,3,3-tetraphenoxy-1,3-disiloxane.

EXAMPLE 32

To about 24.4 parts of 1,3-dimethyl-1,1,3,3-tetrachloro-1,3-disiloxane in about 100 parts of toluene are added about 58.4 parts of diethylamine and heated to reflux temperature for about 1 hour. The reaction mass is filtered and stripped of toluene. A residual product is recovered which contains 1,3-dimethyl-1,1,3,3-tetrakis(N,N-diethylamino)-1,3-disiloxane.

EXAMPLE 33

The procedure described in Example 32 is repeated, except that 32.8 parts of 1,3-dibutyl-1,1,3,3-tetrachloro-1,3-disiloxane are substituted for 1,3-dimethyl-1,1,3,3-tetrachloro-1,3-disiloxane. The resulting product contains 1,3-dibutyl-1,1,3,3-tetrakis(N,N-diethylamino)-1,3-disiloxane.

EXAMPLE 34

The procedure of Example 32 is repeated, except that 145 parts of dicyclohexylamine are substituted for the diethylamine. The resulting product contains 1,3-dimethyl-1,1,3,3-tetrakis(N,N-dicyclohexylamino)-1,3-disiloxane.

EXAMPLE 35

The procedure of Example 33 is repeated, except that 81 parts of butyl-ethylamine are substituted for the diethylamine. The resulting product contains 1,3-dibutyl-1,1,3,3-tetrakis(N-butyl-N-ethylamino)-1,3-disiloxane.

EXAMPLE 36

Grafted organopolysiloxanes are prepared by reacting olefinic compounds with polydimethylsiloxanes in the presence of a free radical initiator at a temperature of from about 30° to 80°C. for a period of from about 1 to 6 hours. The unreacted olefinic compounds are removed at an elevated temperature by applying a vacuum of 1 mm. Hg or less while continuing to heat and stir for an additional hour. The grafted organopolysiloxanes thus prepared are illustrated in Table I.

TABLE II

| Cross-linking ex. no. | Agent ex. no. | parts | grafted organo-polysiloxane ex.no. | Parts | Catalyst Type | parts | tack free time(hr.) |
|---|---|---|---|---|---|---|---|
| 37 | 1 | 3.0 | 28(a) | 31.2 | — | — | 0.2 |
| 38 | 2 | 3.0 | 28(b) | 30.0 | — | — | 0.3 |
| 39 | 3 | 3.0 | 28(c) | 31.0 | — | — | 5.0 |
| 40 | 4 | 3.1 | 28(d) | 32.0 | — | — | 0.2 |
| 41 | 5 | 3.1 | 28(e) | 31.0 | — | — | 0.2 |
| 42 | 6 | 3.0 | 28(f) | 31.0 | — | — | 0.4 |
| 43 | 7 | 3.1 | 28(g) | 32.0 | — | — | 0.1 |
| 44 | 8 | 3.1 | 28(b) | 33.0 | — | — | 1.5 |
| 45 | 9 | 3.2 | 28(c) | 34.0 | — | — | 0.5 |
| 46 | 10 | 3.1 | 28(d) | 32.0 | — | — | 0.1 partial gelation |
| 47 | 11 | 3.2 | 28(e) | 33.3 | — | — | 0.3 |
| 48 | 12 | 3.2 | 28(a) | 33.1 | — | — | 6.0 |
| 49 | 12 | 3.2 | 28(a) | 33.1 | b(DBT)O | 0.05 | 1.0 |
| 50 | 13 | 3.2 | 28(b) | 33.2 | — | — | 8.0 |
| 51 | 14 | 3.3 | 28(b) | 33.3 | — | — | 24.0 |
| 52 | 14 | 3.3 | 28(b) | 33.3 | DBTBC | 0.10 | 4.0 |
| 53 | 15 | 3.1 | 28(b) | 32.0 | — | — | 55.0 |
| 54 | 15 | 3.1 | 28(b) | 32.0 | DBTBC | 0.50 | 24.0 |
| 55 | 16 | 3.1 | 28(c) | 32.1 | — | — | 12.0 |
| 56 | 16 | 3.1 | 28(c) | 32.1 | DBTD | 0.20 | 3.0 |
| 57 | 17 | 3.1 | 28(c) | 32.6 | — | — | 16.0 |
| 58 | 17 | 3.1 | 28(c) | 32.6 | TO | 0.05 | 2.0 |
| 59 | 18 | 3.2 | 28(d) | 33.0 | — | — | 3.0 |
| 60 | 19 | 3.3 | 28(d) | 34.1 | — | — | 5.0 |
| 61 | 20 | 3.1 | 28(e) | 31.2 | — | — | 6.0 |
| 62 | 21 | 3.1 | 28(g) | 31.3 | — | — | 0.4 |
| 63 | 22 | 3.2 | 28(f) | 31.5 | — | — | 1.5 |
| 64 | 23 | 3.3 | 28(f) | 32.1 | — | — | 0.2 |
| 65 | 24 | 3.3 | 28(f) | 32.1 | — | — | 4.5 |
| 66 | 24 | 3.3 | 28(f) | 32.1 | DBTD | 0.1 | 0.5 |
| 67 | 25 | 3.3 | 28(f) | 32.1 | — | — | 0.3 |
| 68 | 26 | 3.2 | 28(a) | 33.1 | — | — | 6.0 |
| 69 | 27 | 3.3 | 28(f) | 32.1 | — | — | 0.4 |
| 70 | 28 | 3.2 | 28(f) | 31.2 | DBTBC | — | 0.7 |
| 71 | 29 | 3.2 | 28(f) | 31.2 | DBTBC | — | 0.9 |
| 72 | 30 | 3.3 | 28(f) | 32.0 | DBTBC | 0.1 | 0.6 |
| 73 | 31 | 3.1 | 28(f) | 31.3 | DBTBC | — | 0.9 |
| 74 | 32 | 3.2 | 28(f) | 31.7 | — | — | 0.5 |
| 75 | 32 | 3.3 | 28(f) | 32.2 | — | — | 0.6 |
| 76 | 34 | 3.3 | 28(f) | 32.0 | — | — | 0.7 |
| 76 | 35 | 3.3 | 28(f) | 32.3 | — | — | 0.6 | b(DBT)O=bis(dibutylhydroxytin)oxide
DBTBC=dibutyltin butoxychloride
DBTD=dibutyltin dilaurate
TO=tin octoate

| Example No. | Olefinic compound Type | Parts | Hydroxylated fluid Viscosity | Parts | Free radical initiator Type | Parts | Reaction conditions Temp., °C. | Time, hr. | Final polymer viscosity, cs. |
|---|---|---|---|---|---|---|---|---|---|
| 36 (a) | Acrylonitrile / Butylacrylate | 14.6 / 35.4 | 1,900 | 50 | t-BP | 0.5 | 80 | 1.5 | 14,000 |
| 36 (b) | Acrylonitrile / Butylacrylate | 9.0 / 51.0 | 800 | 40 | t-BP | 0.5 | 80 | 1.7 | 7,800 |
| 36 (c) | Acrylonitrile / Ethylacrylate / Butylacrylate | 9.1 / 2.9 / 48.0 | 800 | 40 | t-BP | 0.25 | 80 | 2.0 | 20,200 |
| 36 (d) | Methyl acrylate | 50.0 | 400 | 50 | t-BP | 0.5 | 80 | 4.0 | 15,500 |
| 36 (e) | Lauryl methacrylate | 70.0 | 400 | 30 | t-BP | 0.5 | 80 | 5.0 | 19,400 |
| 36 (f) | Styrene / Butylacrylate | 250 / 204 | 610 | 304 | t-BP | 2.0 | 125 | 24 | 14,500 |
| 36 (g) | Vinyl | 45 | 6.700 | 350 | t-BPer | 1.8 | 80 | 4.0 | 17,000 | t-BP=tertiary Butyl Peroxide.
t-BPer=tertiary Butyl Peroctoate.

EXAMPLES 37 TO 76

A reactor containing hydroxyl-terminated modified organopolysiloxanes described in Example 36 is evacuated for about 10 minutes. The cross-linking agents prepared in accordance with the procedures described in Examples 1 through 35 are mixed with the modified organopolysiloxane compositions and heated to a temperature up to about 80°C. with agitation. After about 1 hour, the volatile materials are removed by vacuum distillation, and the residual products placed in molds and allowed to cure at room temperature. These compositions cured to a tack-free condition in a period of time ranging from about 0.1 to about 55 hours. The results are illustrated in Table II.

When the above examples are repeated utilizing other cross-linking agents with other organopolysiloxanes, elastomeric materials are obtained which have properties and curing times substantially equivalent to those of the specified examples.

Although specific examples of the invention have been described herein, other variations and modifications falling within the spirit and scope of the appended claims are to be included therein.

The invention claimed is:

1. A method for preparing a one-component composition stable under anhydrous conditions and convertible to a solid elastomeric state upon exposure to atmospheric moisture, which comprises mixing under substantially anhydrous conditions a siloxane of the formula:

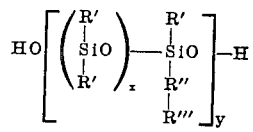

with an organopolysiloxane represented by the formula:

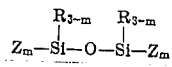

in an amount such that there is at least one mol of siloxane per mol of silicon-bonded hydroxy, R and R' are selected from the group consisting of monovalent hydrocarbon radicals, halogenated monovalent hydrocarbon radicals and cyanoalkyl radicals, R'' is a divalent hydrocarbon radical; ; R''' is a polymeric organic radical linked to R'' by a carbon-to-carbon linkage, said polymeric radical constituted of recurring units derived from monomers containing olefinic unsaturation, said monomers being selected from the class consisting of straight chain olefins, whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles; Z is a hydrolyzable group selected from the class consisting of acyloxy, amino, aminooxy, oximo and phosphato radicals; each $m$ is a number greater than 1; $x$ is a number of from 0 to 20,000 and $y$ is a number of from 1 to 500.

2. A composition which is curable to a solid elastomeric state when exposed to atmospheric moisture having the formula:

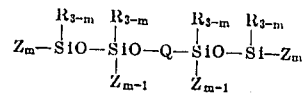

wherein Q is a radical of the formula:

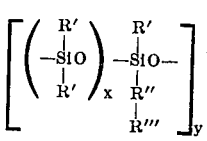

in which R and R' are selected from the group consisting of monovalent hydrocarbon radicals, halogenated monovalent hydrocarbon radicals and cyanoalkyl radicals; R'' is a divalent hydrocarbon radical; R''' is a polymeric radical linked to R'' by a carbon-to-carbon linkage; said polymeric radical constituted of recurring units derived from monomers containing olefinic unsaturation, said monomers being selected from the class consisting of straight chain olefins, whether or not attached to an aromatic nucleus, halogenated olefins, again whether or not attached to an aromatic nucleus, unsaturated acids esters of organic acids in which either the esterifying group or the derivative acid is unsaturated, unsaturated amides and unsaturated nitriles; Z is a hydrolyzable group selected from the class consisting of acyloxy, amino, aminooxy, oximo and phosphato radicals; each $m$ is a number greater than 1; $x$ is a number of from 0 to 20,000 and $y$ is a number of from 1 to 500.

3. The composition of claim 2 wherein Z is an oximo radical.

4. The composition of claim 2 wherein Z is an aminooxy radical.

5. The composition of claim 2 wherein Z is a phosphato radical.

6. The composition of claim 2 wherein Z is an amino radical.

* * * * *